Patented Jan. 13, 1953

2,625,494

UNITED STATES PATENT OFFICE 2,625,494

HEAT-SENSITIVE RECORDING ELEMENT

Montford Morrison, Upper Montclair, N. J.

No Drawing. Application May 5, 1948,
Serial No. 25,312

5 Claims. (Cl. 117—166)

This invention relates to recording media, and particularly to sheet material having a surface which changes in color under the stimulus of heat.

An object of the invention is to provide improvements in coated papers, coated metal foils and other coated supports, which coatings change their color, yielding a visible record, when effected by an application of heat.

Another object of the invention is to provide improvements in papers having incorporated in the bodies thereof, material which will change in color, yielding a visible record on the surface of the paper, when effected by an application of heat.

A further object of the invention is to provide heat recording media having a very white surface of a highly stable composition at temperatures under a substantially fixed critical temperature of threshold endothermic reaction.

A further object of the invention is to incorporate the material used that is subject to stimulus by heat, within a water-resistant envelope, thereby protecting it against the absorbtion of moisture which tends to retard the elevation of temperature of the material under the application of heat, and to introduce operating characteristics which change with the amount of moisture present.

A further object of the invention is to provide, in recording media comprising two chemical compounds which tend to react when in contact, a separating stratum, which does not tend to react at normal ambient temperatures with either of said compounds.

A further object of the invention is to provide, in recording media comprising a chemical compound which tends to melt, react or decompose at temperatures above room temperature, a binding material for said compounds which will decompose with the application of heat at elevated temperatures and thereby act as a stimulus to the melting, reaction or decomposition of said compound.

Other and further objects will be obvious and pointed out in the disclosure of the invention hereunder.

The pertinent prior art may be divided into the following classes:

(a) Electrically conducting supports coated with a single chemical compound which has the property of turning from its natural color to black, upon the application of heat, without reacting with a second compound. None of these prior art compounds are pure white, and among which may be mentioned as illustrative examples mercuric oxide which is red and lead thiosulphate which is dark gray. These compounds are usually applied in a water solution of a binder having the compound in a water suspension, or in suspension in an organic solution of linseed oil.

(b) Non-electrically conducting supports of white paper coated with a water-soluble lead salt (lead acetate), and a water-soluble sulphur bearing compound (thioacetimide); other water soluble metal salts (nickel nitrate, copper nitrate) and other water-soluble sulphur bearing compounds (thiourea, sodium thiosulphate); all in water solutions of water soluble binders.

In order to more clearly define the invention disclosed, some terms used herein, which are occasionally confusingly employed in the art, will be defined for this specification.

Endothermic is primarily a reaction adjective and it is defined as designating, or pertaining to a reaction which occurs with the absorption of heat. In an expression such as "an endothermic compound," endothermic designates a reaction completed in the compound in the static status under consideration, and does not pertain to any reaction which may take place in the compound under subsequent decomposition thereof, because under decomposition the compound ceases to exist.

There is no inference in the definition of an endothermic compound that it will liberate heat under decomposition, it may or may not, depending upon the compound and the mode of decomposition. Many different such behaviors are found among organic compounds.

Likewise, exothermic is primarily a reaction adjective and it is defined as designating or pertaining to a reaction which occurs with the evolution of heat. In an expression such as "an exothermic compound," exothermic designates a reaction completed in the compound in the static status under consideration, and does not pertain to any subsequent reaction which may take place in the compound under decomposition thereof, because under decomposition the compound ceases to exist.

Likewise, there is no inference in the definition of an exothermic compound that it will absorb heat under decomposition, it may or it may not, depending upon the compound and the mode of decomposition. Many different such behaviors are found among organic compounds.

Some organic explosive substances are endothermic compounds in their static state, but under decomposition provide exothermic reaction, and therefore are exothermically decomposable compounds.

Some inorganic substances such as, for instance lead carbonate, are exothermic compounds in their static state, and decompose under endothermic reaction, and therefore are endothermically decomposable compounds.

In the present invention a first generic group of compounds that will react, at elevated temperatures, with a second generic group of compounds with a change in color, are physically combined in a medium in which one of the compounds is not soluble.

The present invention has several generic aspects, and an important one of which is; the reactions between the compounds in the coatings take place in the absence of moisture, and another of which is; the reactions between the compounds take place at critical temperatures sufficiently above room temperature to make them perfectly stable at ambient degrees; a further important one of which is that the binder does not contain elements which tend to react with the material bound.

(c) As a generic formula: a super-saturated solution of a thiourea; such as thiourea (carbamic acid), sym-diphenylthiourea (thiocarbanilide), allylthiourea (thiosinamine); is combined in a coating with an evaporated solution of a cellulose base binder; such as a cellulose nitrate, a cellulose acetate or a derivative thereof, or ethyl cellulose.

The applicant chooses such cellulose derivatives as are soluble in organic-liquids, because water soluble cellulose derivatives are subject to the absorption of water after coating and presence of water in the coating militates against rapid rise of temperature in the coating which material slows up the speed of recording.

Thioureas of this nature are all stable solids at room temperature, when not in solution; but the available sulphur ions may be rendered chemically active by raising the temperatures thereof to their respective melting points or to their respective decomposition temperatures.

Cellulose base compounds of the nature of the above category are all stable solids at room temperature, but react under the stimulus of an elevated temperature above a critical value.

A coating is prepared by milling in a glass ball mill with glass balls, similar to the process of preparing pigmented lacquer in a ball mill. The milling is continued for something of the order of fifty hours and the resulting mixture is applied to a suitable support, usually paper, by a coating machine such as is used in the photographic art for coating film and paper. The applicant uses the so-called wiping system for coating.

However any method of preparing the mixture which will produce the equivalent of the ball-mill method, and system of coating which will produce the equivalent of the paper coating machine may be used. The proportions may have to be adjusted to the method of mixing and the system of coating employed, as is well understood in the art of making coatings for paper supports.

A specific example of the above generic formula is as follows:

(d) 3 grams of 326 viscosity cellulose nitrate is dissolved in 55 c. c. alcohol, 170 c. c. ether and 25 c. c. Cellosolve; to this is added 17.5 grams thiocarbanilide; this mixture is then milled and coated as directed above.

This entire mixture is placed in an all glass ball mill and milled for about 50 hours.

After the milling has been completed, the mixture is coated upon a paper support and is ready for use as a recording paper by the application of heat to the coating.

(e) A further generic formula is a lead base compound that is substantially insoluble in a category of cellulose lacquer solvents; such compounds are: a lead acetate, a lead hydrate or hydroxide, a lead carbonate, and the composition known as white lead; dispersed in a solution of cellulose base binder and a thiourea, the solution comprising one of the above said cellulose lacquer solvents. The binder and the thiourea being of the same categories as given in generic Formula c.

A specific example of the above generic formula is as follows:

(f) 4 grams of 326 viscosity cellulose nitrate is dissolved in 100 c. c. of 25% alcohol and 75% ether, this is diluted with 400 c. c. of 50% alcohol and 50% ether in which 4 c. c. of acetic acid and 5 grams of thiocarbanilide have been dissolved, to this is added 40 grams of basic lead carbonate. The mixture is then milled and coated on a paper as directed before.

(g) A further generic formula is: a lead base compound that decomposes at elevated temperatures; such compounds are: a lead carbonate, a lead chlorate, a lead cyanide, or a lead hydroxide; dispersed in binder that reacts exothermically at a minimum critical temperature to cause decomposition of the lead base compound; such binders are nitrocellulose, 2:4:6-trinitrophenol and the nitrotoluenes (examples—2:4-dinitrotoluene, 2:4:6-trinitrotoluene) used with a suitable known solvent.

A specific eaxmple of the above generic formula is as follows:

(h) 4 grams of 326 viscosity cellulose nitrate is dissolved in 100 c. c. of 25% alcohol and 75% ether, to which 8 grams of basic lead carbonate is added. The mixture is then milled and coated on a paper as directed before.

To more fully understand the nature of the invention some details concerning examples of the formulas will be given.

A coating made according to Formula c which is to be applied to a black paper, will have sufficient of the thiourea in excess of the amount which will go into solution, that the milling operation produces a mixture which has a pigmented property and a reasonably thin coating will give a good white surface which is very sensitive to the application of heat above the decomposition temperature of the thiourea employed in the coating. The chemical reactions of thioureas under the stimulus of heat varies—some melt, some sublime, some decompose chemically—but the intended result sought after in the invention is the same, that is, a record is produced by the application of sufficient heat.

A coating made according to Formula e contains a lead base compound (preferably a white compound) that will react, in the absence of moisture, with sulphur ions in a molten or sublimed state. When sufficient temperature is applied to the coating the sulphur ions in the thiourea become chemically reactive with the lead base compound to form lead sulphide. It is not certain whether the reaction due to melting, sublimation or decomposition of the thiourea, but the intended result sought after in the invention is the same, that is, lead sulphide is produced by the application of sufficient heat.

A coating made according to Formula g contains an endothermically decomposable lead base compound combined with a cellulose binder which reacts exothermically when raised to a predetermined critical temperature.

Coatings made according to these formulas which are mixed and coated in the substantial absence of moisture do not react slowly at room temperature; as do all coatings which depend upon the presence of moisture or upon the pH of the coating, which by definition must contain water; but are perfectly stable at room temperature, as are their related chemical mixtures— Celluloid, white lead paint and gun powder.

Certain of these coatings are applied to a black or dark colored support, because under some circumstances the coating volatilizes and the dark support improves the contrast of the record.

The coatings are preferably water resistant (cellulose compounds) which improves their sensitivity to elevation to the critical temperature required for decomposition, as well as in the consistency of operation improved, by the absence of variable amounts of moisture, as is inevitably the case in non-water resistant coatings.

The exothermic compounds in the coatings are such a small fraction of the total material in the coating, that paper coated with mixtures containing these compounds does not burn perceptibly faster than the same paper without the coating and in the operation of producing recordings with these coatings the reaction does not spread beyond the limits of the applied heat, when properly made.

While the term "coating" is used herein, it is hereby stated that this term is used to include incorporation of the active compounds in the body of the support, which is a variation of the employment of the invention, perfectly obvious to those skilled in the art.

Further and other variations in the employment of the invention will be obvious to those skilled in the art to which the invention appertains.

What I claim is:

1. A heat sensitive recording element comprising a support having a coating containing a lead carbonate and a thiourea uniformly dispersed in a binder containing a cellulose derivative selected from the organic-liquid soluble members of the group consisting of nitro-esters, the acetyl-esters and the ethers of cellulose.

2. A heat sensitive recording element comprising a sulphur vulnerable white lead and a heat vulnerable thiourea uniformly dispersed in a binder containing a cellulose derivative selected from the organic-liquid soluble members of the group consisting of nitro-esters, acetyl-esters and the ethers of cellulose.

3. A heat sensitive recording element comprising a support having a coating containing a lead hydroxide and a thiourea uniformly dispersed in a binder containing a cellulose derivative selected from the organic-liquid soluble members of the group consisting of nitro-esters, acetyl-esters and the ethers of cellulose.

4. A heat sensitive recording element comprising a support having a coating containing thiocarbanilide and a lead salt uniformly dispersed in a binder containing a cellulose derivative selected from the organic-liquid soluble members of the group consisting of nitro-esters, the acetyl-esters and the ethers of cellulose.

5. A heat sensitive recording element comprising a support having a coating containing thiocarbanilide and a lead hydroxide dispersed in a binder containing a cellulose derivative selected from the organic-liquid soluble members of the group consisting of nitro-esters, the acetyl-esters and the ethers of cellulose.

MONTFORD MORRISON.

REFERENCES CITED

The following references are of record in the file of this patent:

UNITED STATES PATENTS

| Number | Name | Date |
|---|---|---|
| 1,734,519 | Hand | Nov. 5, 1929 |
| 1,863,834 | Coolidge | June 21, 1932 |
| 1,880,449 | Hickman et al. | Oct. 4, 1932 |
| 1,965,453 | Bucy | July 3, 1934 |
| 1,976,302 | Sheppard et al. | Oct. 9, 1934 |
| 2,039,302 | Dreyfus | May 5, 1936 |
| 2,209,087 | Leuch | July 23, 1940 |
| 2,299,693 | Green | Oct. 20, 1942 |
| 2,310,946 | Finch | Feb. 16, 1943 |
| 2,358,839 | Wagner | Sept. 26, 1944 |

FOREIGN PATENTS

| Number | Country | Date |
|---|---|---|
| 372,637 | Great Britain | May 12, 1932 |

OTHER REFERENCES

Hopkins Sc. Am. Cyclopedia of Formulas, 1925, page 637.